United States Patent [19]

Davin

[11] Patent Number: 5,144,638
[45] Date of Patent: Sep. 1, 1992

[54] MASTER DYE LASER OSCILLATOR INCLUDING A SPECIFIC GRATING ASSEMBLY FOR USE THEREIN

[75] Inventor: James M. Davin, Livermore, Calif.
[73] Assignee: The United States of America as represented by the United States Department of Energy, Washington, D.C.
[21] Appl. No.: 314,691
[22] Filed: Jan. 31, 1989

Related U.S. Application Data

[63] Continuation of Ser. No. 911,192, Sep. 22, 1986, abandoned.

[51] Int. Cl.$^5$ .................. H01S 3/08; H01S 27/02; H01S 3/20
[52] U.S. Cl. .................. 372/107; 372/102; 372/55; 372/20; 372/54

[56] References Cited

U.S. PATENT DOCUMENTS

| | | | |
|---|---|---|---|
| 3,443,243 | 5/1969 | Patel | 372/20 |
| 3,697,889 | 10/1972 | Dewey | 372/20 |
| 3,710,277 | 1/1973 | Forbes | 372/102 |
| 3,745,484 | 7/1973 | Coristi | 372/53 |
| 3,810,042 | 5/1974 | Chang et al. | 372/20 |
| 3,868,590 | 2/1975 | Itzleen et al. | 372/53 |
| 4,674,097 | 6/1987 | Fountain | 372/54 |

OTHER PUBLICATIONS

Schmidt, A. S.; "Simultaneous Two-Wavelength . . . Dye Laser"; Jul. 1975; Opt. Corrum., vol. 14, #3, pp. 294–295.

Primary Examiner—Nelson Moskowitz
Attorney, Agent, or Firm—Miguel A. Valdes; Roger S. Gaither; William R. Moser

[57] ABSTRACT

A dye laser oscillator for producing a tuned dye beam is disclosed herein and includes, among other components, a beam output coupling assembly, a dye cell assembly, a beam expander assembly, an etalon assembly, and a grating assembly. Each of three assemblies is vertically supported from a horizontal base so as to be readily removable from the base without interference from or interfering with the other assemblies. The particular grating assembly disclosed is specifically designed for proper optical alignment with the intended path of the dye beam to be produced and for accurate pivotal movement relative to the beam path in order to function as a coarse tuning mechanism in the production of the ultimately tuned beam.

9 Claims, 3 Drawing Sheets

MASTER DYE LASER OSCILLATOR INCLUDING A SPECIFIC GRATING ASSEMBLY FOR USE THEREIN

The United States Government has rights in this invention pursuant to Contract No. W-7405-ENG-48 between the United States Department of Energy and the University of California for the operation of the Lawrence Livermore National Laboratory.

This is a continuation of application Ser. No. 911,192 filed Sep. 22, 1986, now abandoned.

BACKGROUND OF THE INVENTION

The present invention relates generally to a dye laser oscillator including a number of cooperating components for producing a tuned dye beam and more particularly to a specific structural arrangement between these cooperating components and a specific grating assembly which serves as a coarse tuning mechanism in the production of the ultimately tuned beam.

A typical dye laser oscillator includes, among other components, a dye cell assembly, a beam expander, an etalon, a grating assembly, and an output coupler which supports an end mirror. A pump laser beam, for example a copper vapor laser beam, is directed into the dye cell which is designed to receive a continuous supply of dye therethrough. This produces a dye beam which is directed through the beam expander, the latter serving to expand the beam in one direction as much as forty fold, whereby to produce a ribbon of light. This ribbon passes through the etalon and on to the grating which directs a beam (actually a portion thereof) back through the etalon, the beam expander and into the dye cell where it is amplified before finally impinging on the end mirror of the output coupler. A portion of this beam passes through the end mirror and forms the ultimately produced output of the overall oscillator. The rest of the beam is reflected back into and through the dye cell where the process is repeated for purposes of amplification. The etalon and grating assembly serve to limit the ultimately produced beam to a particular narrow wavelength band, the grating serving as a coarse tuning mechanism and the etalon serving as a fine tuning mechanism.

In a dye laser oscillator of the general type just described, it is desirable to minimize the path length taken by the beam within the cavity between its endmost components, specifically its output coupler and grating assembly. This requires a rather compact design. At the same time, it is desirable to be able to readily remove any one of the recited components making up the oscillator without interference from or interfering with the other components. As will be seen hereinafter, the present invention provides an uncomplicated and yet reliable means of accomplishing this.

As stated above, one of the specific components making up the general type of dye laser oscillator is a grating assembly which serves as a coarse tuning mechanism in the production of the ultimately tuned beam leaving the oscillator. In order to accomplish this, the grating assembly includes a grating having an active grating face through which the dye beam is intended to reflect off of dispersing the beam before passing through the laser cavity and leaving the oscillator as well as means for varying the angle at which the beam impinges the grating face which, in turn, varies the wavelength band of the beam. Heretofore, the grating assembly was supported at its end closest to the base for vertical rotation such that this movement took place about a vertical axis by means of a single vertical shaft supported by two tapered roller bearings, thereby leaving the top end of the grating assembly unsupported. This was found to be relatively unstable from a structural standpoint. As will be seen hereinafter, the present invention eliminates this structural instability.

Still referring to the grating assembly forming part of the overall dye laser oscillator of the prior art, it has been found that proper alignment of this component with the intended beam path of the oscillator is critical. This criticality has not been designed into the grating assembly heretofore but does appear in the present invention, as will be seen.

SUMMARY OF THE INVENTION

In view of the foregoing, it is one object of the present invention to provide an uncomplicated and yet reliable way of supporting the above-recited components making up a dye laser oscillator, specifically its dye cell assembly, beam expander, etalon, grating assembly and output coupler, such that each can be easily removed from a horizontally extending support base without interference from or interfering with the other components.

Another object of the present invention is to provide a specifically designed grating assembly which is supported for pivotal movement (tuning) about a horizontal axis by means of pivot supporting means located equidistant from the base supporting the grating assembly whereby to eliminate structural instability resulting from the abovedescribed vertical arrangement.

Still another object of the present invention is to provide a grating assembly having two types of position adjustment arrangements whereby to assure that the grating itself is appropriately aligned with the intended beam path of the overall oscillator.

In the specific dye laser oscillator disclosed herein, a horizontally extending support base is provided to support the previously described components. In accordance with one aspect of the present invention, each of these components, that is, the dye cell assembly, the beam expander, the etalon, the grating assembly and the output coupler, is horizontally spaced from the other components and extends vertically from the base in a cantilevered fashion. Means are provided for supporting each of these components at its lowermost end to the base so as to be easily removable from the base without interference from or interfering with the other components. At the same time, only the base serves as a common connection between all of the these components and, hence, spatial displacement between components due to thermal expansion and contraction is limited to the thermal expansion and contraction of the base which can be minimized by making the base from a material displaying a low thermal coefficient such as invar. This is to be contrasted with a previously provided oscillator in which the components corresponding to those recited were supported from a base by interconnecting rails of relatively long length. These rails not only interfered with the removal of individual components but also affected the spatial relationship between the components due to their own thermal expansion and contraction.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The overall dye laser oscillator disclosed herein and particularly its grating assembly will be described in more detail hereinafter in conjunction with the drawings wherein.

DETAILED DESCRIPTION OF THE INVENTION

Reference will now be made in detail to a preferred embodiment of the invention, an example o which is illustrated in the accompanying drawings. While the invention will be understood that it is not intended to limit the invention to that embodiment. On the contrary, it is intended to cover all alternatives, modifications and equivalents as may be included within the spirit and scope of the invention as defined by the appended claims.

Figure 1:
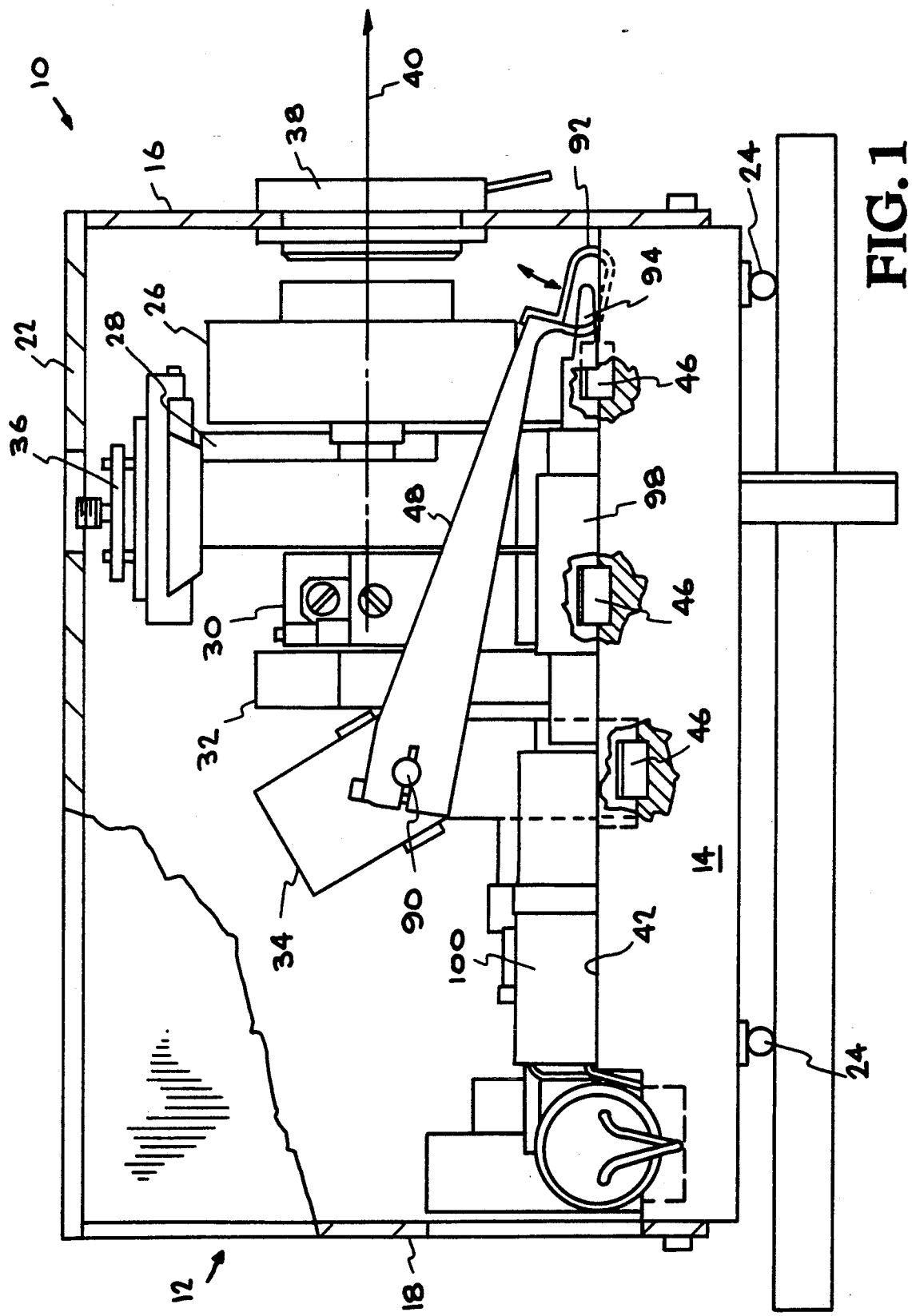
FIG. 1 is a side elevational view of the overall dye laser oscillator designed in accordance with the present invention.
Figure 2:
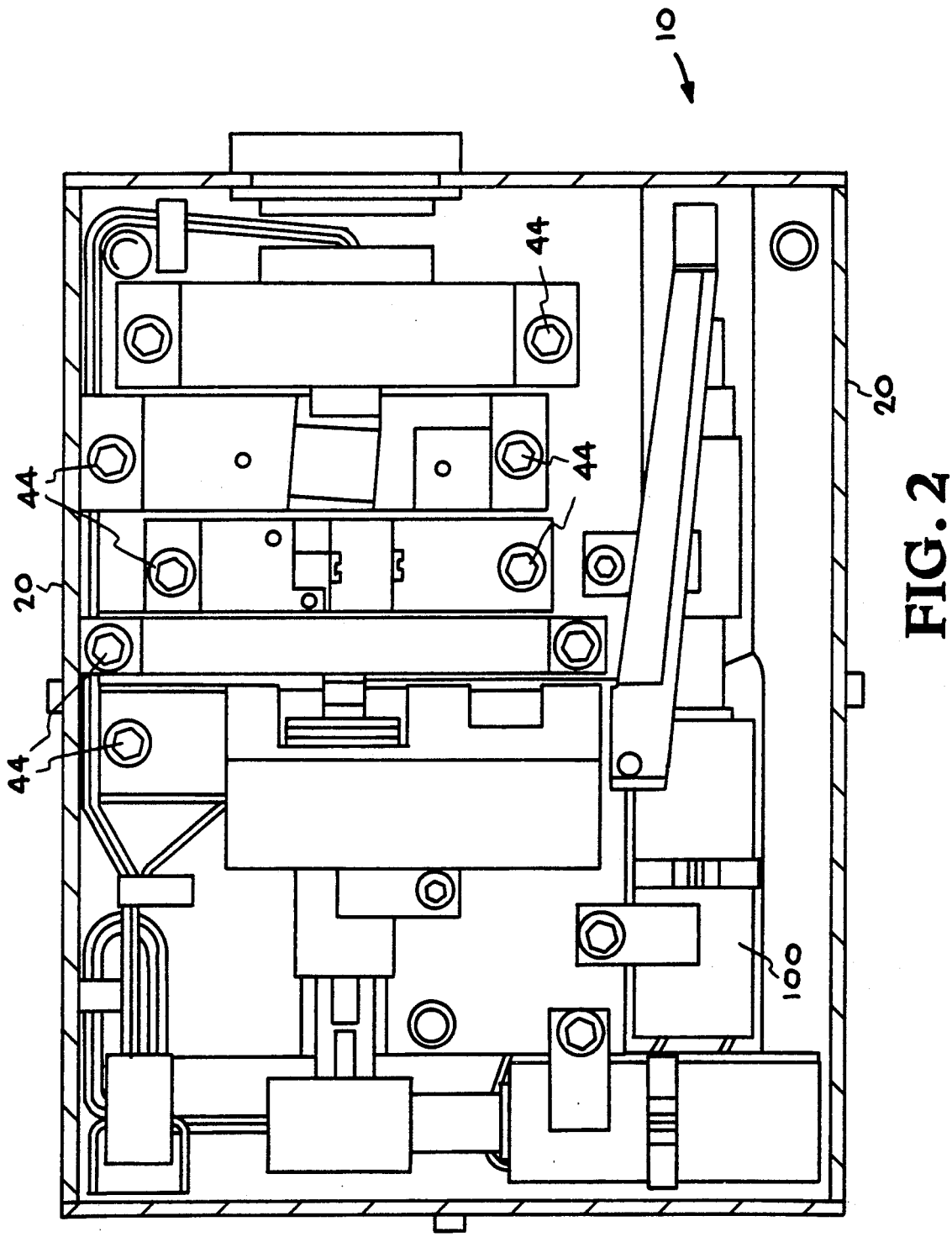
FIG. 2 is a plan view of the oscillator illustrated in FIG. 1.

Turning now to the drawings, wherein like components are designated by like reference numerals throughout the various figures, attention is initially directed to FIGS. 1 and 2 which together illustrate an overall master dye laser oscillator designed in accordance with the present invention. This oscillator, which is generally indicated by the reference numeral 10 in FIGS. 1 and 2, includes an overall housing 12 comprised of a horizontally extending base 14, upstanding front and back walls 16 and 18, respectively, side walls 20 and a top cover 22. For reasons to be discussed hereinafter, the base 14 is preferably constructed of invar or possibly some other structurally sound material which displays a relatively low coefficient of thermal expansion. While not shown, the entire housing may be supported on a base plate and, to this end, includes tooling balls 24 designed to interact with cooperating components on the base plate in a known manner.

Still referring to FIGS. 1 and 2, dye laser oscillator 10 is shown including a beam output coupling assembly 26, a dye cell assembly 28, a beam expander assembly 30, an etalon assembly 32, and a grating assembly 34, each of which is contained within housing 12 in the manner to be described hereinafter. These assemblies in combination with other components making up the overall oscillator function in a generally known way to produce a tunable dye beam which may be subsequently amplified. The present invention is not directed to the way in which these various components operate optically to provide this beam and, hence, these components will not be described in detail from an optical standpoint.

It suffices to say that the dye cell assembly 28 includes a dye cell which is designed to receive a continuous supply of dye therethrough from a suitable source (not shown). At the same time, the dye within the cell is pumped by means of a suitable pump beam, for example one from a copper vapor laser and is directed into the cell through suitable means. In the particular embodiment illustrated, the pump beam is carried to the oscillator housing by optical fiber means and into the cell through a fiber optics interface 36 which is the subject of pending U.S. patent application Ser. No. 620,305, filed Jun. 13, 1984, and entitled FIBER OPTICS INTERFACE FOR A DYE LASER OSCILLATOR AND METHOD. After the dye beam is initially produced by dye cell assembly 28 it is acted on by the beam expander assembly 30 which serves to expand it in one direction, preferably as much as forty fold, whereby to provide a ribbon of light. This ribbon is then acted on by the etalon assembly and thereafter reflected and dispersed by the grating forming part of the overall grating assembly 34 which directs the ribbon-like beam (actually a portion thereof) back through the etalon assembly, the beam expander and into the dye cell where it is amplified. The amplified beam eventually impinges on an end mirror forming part of the output coupler assembly. A portion of this beam passes through the end mirror and out of housing 12 through an iris diaphragm arrangement 38 to form the ultimately produced output beam which is generally indicated at 40. The rest of the beam is reflected back into and through the dye cell where the process is repeated for purposes of amplification. The etalon and grating assemblies serve to limit the ultimately produced beam to a particular narrow wavelength band, the grating assembly serving as a coarse tuning mechanism and the etalon assembly serving as a fine tuning mechanism.

As stated previously, in a dye laser oscillator of the general type just described, it is desirable to minimize the path length taken by the beam by reducing the cavity size between its endmost components, specifically its output coupler and its grating assembly. This requires a rather compact design. At the same time, it is important to preserve the spatial relationship between the various optical components making up the oscillator, specifically the assemblies recited above. It is also desirable to be able to readily remove any one of these assemblies without interference from or interference with the other assemblies. The present invention provides an uncomplicated and yet reliable way of accomplishing both of these objectives, as will be seen below.

As best illustrated in FIG. 1, the output coupler assembly, the dye cell assembly, the beam expander assembly, the etalon assembly, and the grating assembly all extend vertically from the top surface 42 of base 14 in a cantilevered fashion and each is horizontally spaced from the other. Moreover, each of these assemblies is fixedly mounted to base 14 at its bottom end only by means of suitable bolts 44 or the like shown in FIG. 2. The output coupler assembly, beam expander assembly and the grating assembly are all keyed to the base by means of keys 46. Because each of the assemblies is mounted in place at its bottom end only and is horizontally spaced from the other assemblies, it can be easily removed from the base without interference from or interfering with the other assemblies. This is accomplished by disengaging its lower end from base 14 by removing the bolt means 44 or the like and thereafter lifting the disengaged assembly up out of housing 12 vertically after removing cover 22. This may require disconnecting certain components operatively connecting the assembly to be removed. For example, when removing grating assembly 34, it may be necessary to disconnect it from its grating arm 48 which will be discussed below. Also, when removing the dye cell assembly 28, it may be necessary to first remove cooperating hosing (not shown) serving to carry dye into and out of the dye assembly. Moreover, in the actual embodiment, in order to conserve space, a component of the output coupler assembly cantilevers over the dye cell assembly, thereby requires that this former assembly be removed before removing the dye cell assembly. It may also be necessary to remove the fiber optic interface 36 (if such a device is used), although the fiber optic interface could be removed with the dye assembly.

The way in which the operating assemblies just described are mounted within housing 12 should be contrasted with a previously proposed arrangement, specifically the use of one or more common rails supporting the top ends of the assemblies. Because of these rails, each and every assembly could not be removed without removing the other assemblies. Also, the rails tended to thermally expand and contract in different ways along their lengths, thereby adversely affecting the spatial relationship between assemblies. By eliminating these rails in accordance with the present invention and by making base 14 of a material having a relatively small coefficient of thermal expansion, for example the previously mentioned invar, it is possible to minimize spatial variation between assemblies due to variations in thermal expansion and contraction across the overall oscillator.

Having described the overall master dye laser oscillator 10, it is to be understood that the various components making up this oscillator including the operating assemblies recited above are known in the art or may be readily provided by those skilled in the art, with certain exceptions. First, the specific way in which the above-recited operating assemblies are mounted in the cantilevered fashion described forms part of the present invention. Second, the overall oscillator preferably includes a specific grating assembly which is mechanically designed in accordance with the present invention, as will be discussed below. In this regard, it is to be further understood that the way in which the operating assemblies are cantilever mounted does not require this particular grating assembly but rather also contemplates one known in the art. By the same token, the particular grating assembly to be described below does not have to be incorporated into an oscillator having cantilever mounted operating assemblies.

Figure 3:
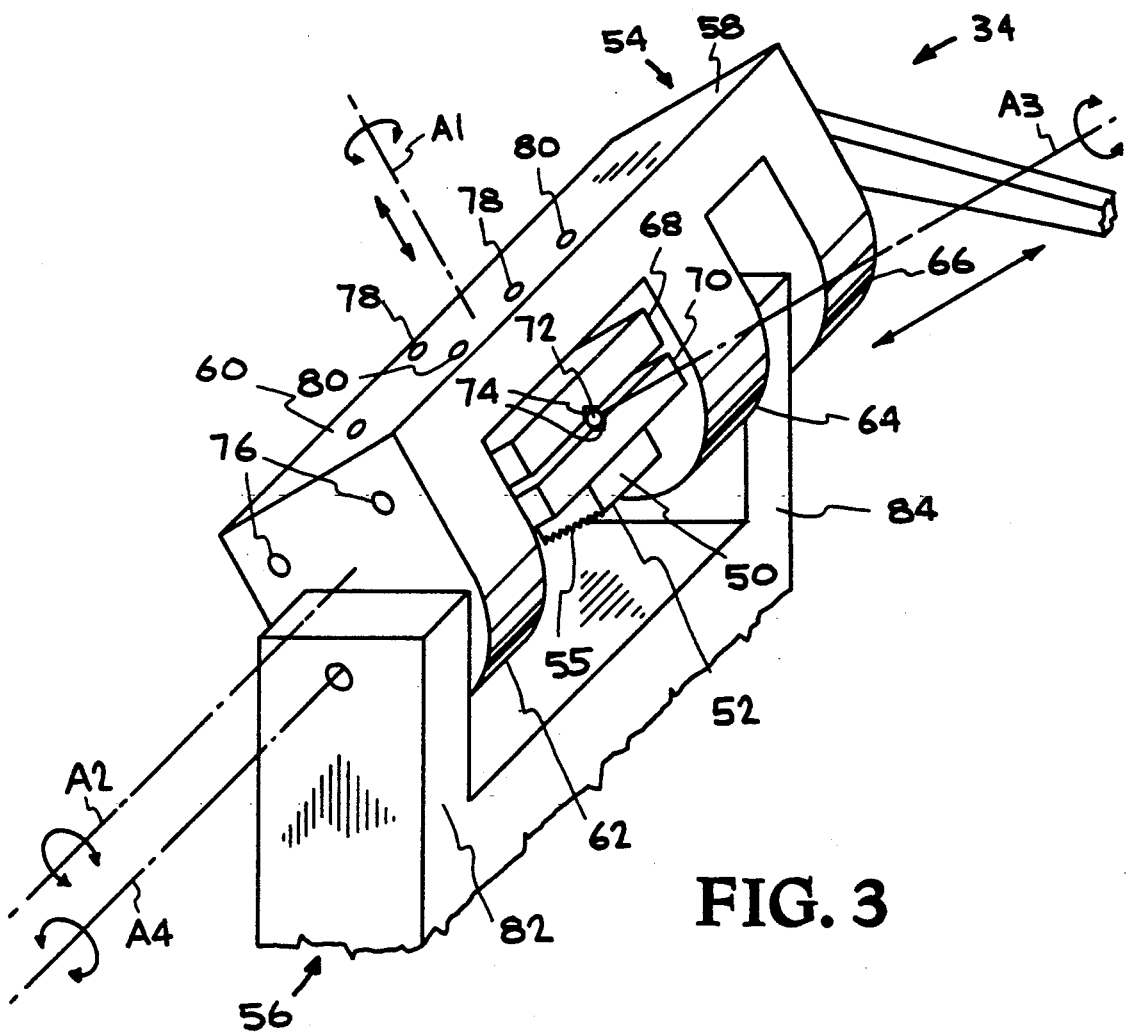
FIG. 3 is a perspective view of a grating assembly forming part of the oscillator of FIGS. 1 and 2.
Figures 4, 5:
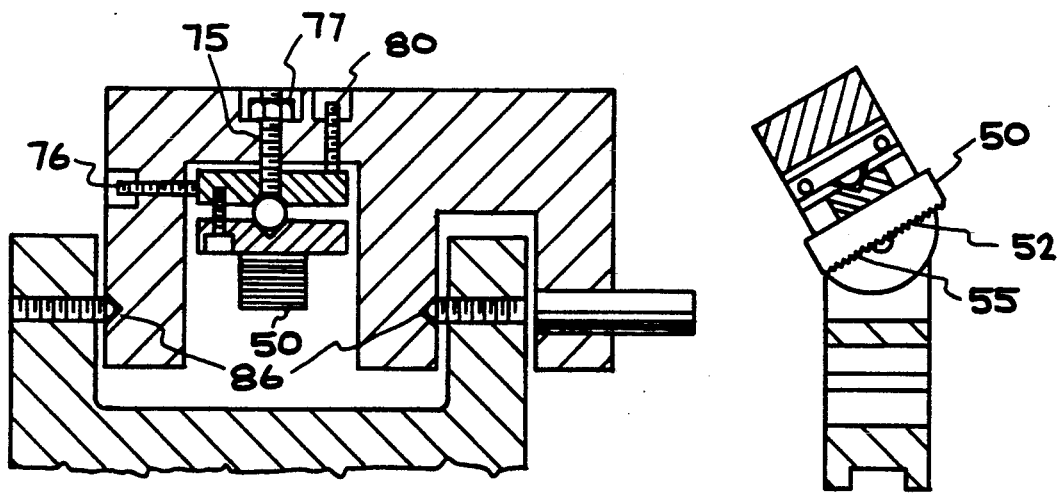
FIG. 4 is an end view of the grating assembly of FIG. 3.
FIG. 5 is a side view of the grating assembly of FIG. 3.

Turning now to FIGS. 3-5, attention is directed to a detailed description of grating assembly 34 from a structural standpoint. This assembly is shown including an optical grating 50 having an active grating face 52. The grating is supported by an arrangement generally indicated at 54 for movement in a number of different ways, as will be described below, such that the grating face can be fixed in place at a particular initial operating orientation with the horizontal path of the dye beam within housing 12. At the same time, arrangement 54 and grating 50 are both supported by an arrangement 56 for limited pivotal movement in a particular manner which will also be described below. As stated above, grating assembly 34 serves as a coarse tuning mechanism in the production of dye beam 40. To this end, grating face 52 includes a series of parallel grating lines 55 disposed within a common plane (the face of the grating). Support arrangements 54 and 56 are intended to first place the grating face in an initial operating position such that the grating lines are horizontal and the common plane is normal to the beam path. Once this is done, the grating face can be pivoted by means of arrangement 54 so as to change its angle with the beam in order to provide coarse tuning of the latter.

Referring to FIGS. 4 and 5 in conjunction with FIG. 3, attention is directed to arrangement 54 forming part of the overall grating assembly 34. This arrangement includes what may be referred to as a grating pivot 58 comprised of an upper, horizontally extending base member 60 and three spaced-apart, parallel legs 62, 64 and 66 depending vertically downward from the base member. A pair of parallel plates 68 and 70 are disposed under base member 60 between legs 62 and 64. These plates are held in spaced-apart relationship to one another by means of a central tooling ball 72 located within opposing sockets 74 in the confronting faces of the two plates, an upwardly extending shaft 75 fixedly connected to the ball, and extending through the base member, and a hexnut 77 (see FIG. 4) connected to the free end of shaft 75. This arrangement allows the two plates to pivot within the two legs 62 and 64 to a limited extent about any diameter of tooling ball 72. As will be discussed below, arrangement 54 includes specific means to pivot the two plates as a unit about the three orthogonal axes A1, A2 and A3 shown in FIG. 3. In addition, the two plates can be moved to a limited extent back and forth along axis A1 which is coaxial with the shaft of the tooling ball. As illustrated in FIG. 3, grating 50 is fixedly mounted to the underside of plate 70 and hence moves with the latter.

In order to pivot the two plates 68, 70 about axis A1, a pair of push and pull set screws 76 are located in and extend through leg 62 so as to engage against opposite ends of the plate 68. By screwing in on one set screw 76 while screwing out on the other, the innermost ends thereof engage end plate 68 so as to cause the latter to pivot about axis A1 in the desired direction. Similar push and pull set screws 78 extend through base member 60 directly above plate 68 for causing the two plates to pivot about the A2 axis. Still a third set of push and pull set screws 80 which also extend through the base member engage a top plate so as to pivot the latter about the A3 axis. Thus, it is possible to pivot the two plates about any combination of these axes to appropriately position the grating 50 in the desired manner.

Having described arrangement 54, attention is now directed to arrangement 56 which serves as a grating base for pivotally supporting the grating pivot 58 and therefore the rest of arrangement 54 and grating 50 for movement back and forth about a fourth axis A4. To this end, arrangement 56 includes a pair of spaced-apart upstanding legs 82 and 84. Leg 82 is disposed adjacent to the outside surface of leg 62 and leg 84 is disposed between the legs 64 and 66. As best illustrated in FIG. 4, the two legs support the two legs 62, 64 by means of captive tooling balls 86 which define the A4 axis. In this way, once the grating is adjusted by means of arrangement 54, the grating can be rotated into different positions about the A4 axis so as to provide the ultimate coarse tuning of dye beam 40. This allows for tuning about a horizontal axis (e.g. the A4 axis) at a location relatively close to base 14 which, in turn, adds greater structural stability to the overall grating assembly than is possible using a vertical pivot approach.

In view of overall operation of dye laser oscillator 10, the coarse tuning of beam 14 is preferably carried out automatically. To this end, the grating assembly includes previously recited pivot arm 48 which is mounted for rotation at one end to a cooperating pin 90 connected to and extending out from the outer side of leg 66 in a way which causes the grating pivot 58 to pivot about the A4 axis. The other end of the grating arm is connected to a pivot arm spring 92 which engages in a cam-like action against the outer surface of a sine tip 94 connected to one end of a micrometer 98. The micrometer is driven through a series of gears by a suitable motor means 100 whereby to cause the sine tip to move longitudinally along its own axis. This movement is converted by means of spring 92 to pivotal movement of arm 48 which in turn pivots a grating pivot 58 about the A4 axis in the desired way. In accordance with the present invention, the sine tip is disengagably connectable by threaded coupling, for example, with the micrometer so as to be readily replaced by a sine tip having a different configuration.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed:

1. In a dye laser oscillator including a number of cooperating components for producing along a horizontal path a dye beam which is ultimately tuned to a particular wavelength band before leaving the oscillator, a grating assembly serving as a coarse tuning mechanism in the production of the ultimately tuned beam, said grating assembly comprising:
   (a) an optical grating having a main body including an active grating face through which said dye beam is intended to be reflected and dispersed off of before leaving said oscillator;
   (b) alignment means for supporting said grating body, said alignment means including adjustment means that allows selected movement of said grating within a plurality of degrees of freedom to precisely and fixedly place said grating face in and at a particular selected initial opening orientation with respect to the horizontal path of said dye beam; and
   (c) tuning means for supporting said grating body and said alignment means for limited pivotal movement about an axis transverse to said beam path in order to vary the angle at which the dye beam impinges the grating face whereby to vary the wavelength band of said beam.

2. A grating assembly according to claim 1 wherein said alignment means includes a main support structure and wherein said tuning means includes a pair of point support bearings for supporting said grating body and said main support structure for said pivotal movement at two horizontally spaced points.

3. A grating assembly according to claim 1 wherein said grating face includes a series of parallel grating lines disposed within a common plane and wherein the initial operating position of said grating face is such that said grating lines are horizontal and said common plane is normal to said beam path.

4. A grating assembly according to claim 3 wherein said alignment means includes a pair of spaced-apart confronting plates fixedly supporting said grating body and including opposing sockets, a tooling ball within said opposing sockets such that the confronting plates are pivotable about any diameter of said ball, means for supporting said tooling ball and therefore said plates for limited vertical movement, and means for adjustably pivoting said plates around said tooling ball about a set of orthogonal axes through the center of said ball.

5. A grating assembly according to claim 1 wherein said tuning means includes power driven means cooperating with said alignment means for pivoting said grating body and alignment means about said transverse axis, said power driven means including a precision micrometer carrying a sine bar tip, means for moving the tip along a straight line path, a pivot arm connected with said alignment means, and means connecting said pivot arm with said tip such that the straight-line movement of the tip causes said pivot arm to pivot said alignment means and said grating body.

6. A grating assembly according to claim 5 wherein said sine bar tip is readily disengagably connected with said micrometer whereby it can be easily replaced with a different sine bar tip.

7. A grating assembly for use in a dye laser oscillator that includes a number of cooperating components for producing a dye beam, the grating assembly comprising:
   an optical grating reflector;
   a support member for holding said grating reflector;
   alignment means for precisely positioning the grating reflector relative to the support member, the alignment means including adjustment means for pivoting said optical grating about three mutually orthogonal axes to precisely position the grating reflector relative to the dye beam and holding the grating reflector in the selected position relative to the support member;
   tuning means, independent of said alignment means for pivoting said support member about a single axis of rotation to vary the angle at which the dye beam strikes the grating reflector to coarsely tune the frequency of the dye beam outputted by the oscillator.

8. A grating assembly as recited in claim 7 wherein said alignment means includes:
   a pair of spaced-apart confronting plates each including an opposing socket, wherein the grating reflector is secured to a first one of said confronting plates;
   a tooling ball disposed within said opposing sockets and arranged such that said first confronting plate may be pivoted about the tooling ball in any direction relative to the support member.

9. A grating assembly as recited in claim 8 wherein said adjustment means includes a multiplicity of push/pull screw pairs extending through said support member for engaging at least one of said confronting plates to pivot said first confronting plate relative to said support member, wherein said various push/pull screw pairs each pivot said first confronting plate about mutually orthogonal axis.

* * * * *